US012466025B2

(12) United States Patent
Misra et al.

(10) Patent No.: US 12,466,025 B2
(45) Date of Patent: Nov. 11, 2025

(54) PAD SURFACE REGENERATION AND METAL RECOVERY

(71) Applicant: ChEmpower Corporation, Beaverton, OR (US)

(72) Inventors: Sudhanshu Misra, Beaverton, OR (US); Babu Suryadevara, Portland, OR (US)

(73) Assignee: ChEmpower Corporation, Beaverton, OR (US)

( * ) Notice: Subject to any disclaimer, the term of this patent is extended or adjusted under 35 U.S.C. 154(b) by 330 days.

(21) Appl. No.: 17/729,805

(22) Filed: Apr. 26, 2022

(65) Prior Publication Data
US 2022/0355439 A1 Nov. 10, 2022

Related U.S. Application Data

(60) Provisional application No. 63/179,995, filed on Apr. 26, 2021.

(51) Int. Cl.
*B24B 53/017* (2012.01)
*B01D 11/04* (2006.01)
(Continued)

(52) U.S. Cl.
CPC ............ *B24B 53/017* (2013.01); *B01D 11/04* (2013.01); *B01D 11/0415* (2013.01); *B24B 37/24* (2013.01); *C22B 3/02* (2013.01)

(58) Field of Classification Search
CPC ..... B24B 53/017; B24B 37/24; B24B 37/044; B24B 57/02; B01D 11/04; B01D 11/0415; C22B 3/02
See application file for complete search history.

(56) References Cited

U.S. PATENT DOCUMENTS 5,114,579 A * 5/1992 Takigawa ........... B01D 11/0415
210/651
5,810,964 A 9/1998 Shiraishi
(Continued)

FOREIGN PATENT DOCUMENTS

CN 1771586 A * 5/2006 ............. B24B 37/00
CN 100592474 C * 2/2010 ........... H01L 21/304
(Continued)

OTHER PUBLICATIONS

CN-100592474-C, Machine Translation (Year: 2025).*
(Continued)

*Primary Examiner* — Duy Vu N Deo
*Assistant Examiner* — Christopher Remavege
(74) *Attorney, Agent, or Firm* — Alleman Hall & Tuttle LLP (57) ABSTRACT

A method comprises planarizing a substrate material with a functionalized chemical planarization pad. The functionalized chemical planarization pad includes a plurality of functional groups bonded to a material of the pad. The functional groups are configured to chemically react with the substrate material such that a portion of substrate material bonds to the functional groups. The pad is regenerated by applying a regeneration solution configured to break bonds between the functional groups and substrate material bonded to the functional groups to form removed material. The removed material is complexed in a dissolved complexing agent to form dissolved material in an effluent phase.

16 Claims, 7 Drawing Sheets

(51) Int. Cl.
*B24B 37/24* (2012.01)
*C22B 3/02* (2006.01)

(56) References Cited

U.S. PATENT DOCUMENTS

| | | | |
|---|---|---|---|
| 5,868,935 A * | 2/1999 | Sirkar | C22B 3/02 |
| | | | 210/639 |
| 5,899,745 A | 5/1999 | Kim et al. | |
| 6,220,934 B1 | 4/2001 | Sharples et al. | |
| 6,315,857 B1 | 11/2001 | Cheng et al. | |
| 6,475,332 B1 | 11/2002 | Boyd et al. | |
| 6,482,077 B1 | 11/2002 | Doan et al. | |
| 6,579,157 B1 | 6/2003 | Gotkis et al. | |
| 6,596,388 B1 * | 7/2003 | Obeng | B24B 37/24 |
| | | | 428/524 |
| 6,672,949 B2 | 1/2004 | Chopra et al. | |
| 6,875,091 B2 | 4/2005 | Radman et al. | |
| 7,086,936 B1 | 8/2006 | Kiermasz | |
| 7,947,170 B2 * | 5/2011 | Golden | B01J 41/04 |
| | | | 210/85 |
| 10,385,236 B2 | 8/2019 | Reichardt et al. | |
| 11,545,365 B2 * | 1/2023 | Misra | C09G 1/18 |
| 2001/0006881 A1 | 7/2001 | Chopra et al. | |
| 2002/0006767 A1 * | 1/2002 | Wang | B08B 3/08 |
| | | | 134/2 |
| 2002/0078632 A1 * | 6/2002 | Hasegawa | B24B 37/24 |
| | | | 51/298 |
| 2002/0098778 A1 * | 7/2002 | Takashima | B24B 37/24 |
| | | | 451/36 |
| 2002/0146966 A1 | 10/2002 | Renteln | |
| 2002/0168845 A1 * | 11/2002 | Ellis | H01L 24/05 |
| | | | 257/E21.508 |
| 2003/0031876 A1 * | 2/2003 | Obeng | B24B 37/24 |
| | | | 428/423.1 |
| 2003/0032371 A1 | 2/2003 | Weinstein et al. | |
| 2005/0016868 A1 | 1/2005 | Basol et al. | |
| 2006/0205325 A1 * | 9/2006 | Abe | B24B 57/02 |
| | | | 451/36 |
| 2007/0037491 A1 * | 2/2007 | Li | H01L 21/3212 |
| | | | 451/41 |
| 2008/0034670 A1 * | 2/2008 | Li | H01L 21/3212 |
| | | | 51/298 |
| 2008/0047901 A1 * | 2/2008 | Golden | B01D 15/00 |
| | | | 210/683 |
| 2009/0137191 A1 * | 5/2009 | Lee | B08B 1/52 |
| | | | 451/36 |
| 2010/0108609 A1 | 5/2010 | Wismer et al. | |
| 2015/0307965 A1 * | 10/2015 | Boudreault | C01D 1/00 |
| | | | 423/21.5 |
| 2016/0354896 A1 | 12/2016 | Lewis et al. | |
| 2020/0108356 A1 * | 4/2020 | Lim | B01D 67/00091 |
| 2020/0246937 A1 | 8/2020 | Bresson | |
| 2020/0365412 A1 * | 11/2020 | Misra | B24B 21/008 |
| 2021/0098266 A1 | 4/2021 | Lee et al. | |
| 2022/0226959 A1 * | 7/2022 | Barton | B24B 37/22 |
| 2023/0077988 A1 | 3/2023 | Misra et al. | |

FOREIGN PATENT DOCUMENTS

| | | | | |
|---|---|---|---|---|
| CN | 118448284 A | * | 8/2024 | H01L 21/60 |
| EP | 1610365 B1 | * | 8/2012 | C23F 1/46 |
| JP | 2004075859 A | * | 3/2004 | |
| JP | 2013219307 A | | 10/2013 | |

OTHER PUBLICATIONS

CN-118448284-A, Machine Translation. (Year: 2025).*
CN-1771586-A, Machine Translation (Year: 2025).*
EP-1610365-B1, Machine Translation. (Year: 2025).*
JP-2004075859-A, Machine Translation. (Year: 2025).*
ISA United States Patent and Trademark Office, International Search Report Issued in Application No. PCT/US2022/026364, Sep. 7, 2022, WIPO, 11 pages.
"Lam's Teres CMP system qualified for 0.18-micron copper at TSMC," EETimes), Available Online at www.eetimes.com/lams-teres-cmp-system-qualified-for-0-18-micron-copper-at-tsmc/, Oct. 19, 1999, 1 page.
ISA United States Patent and Trademark Office, International Search Report and Written Opinion Issued in Application No. PCT/US22/75778, Jan. 17, 2023, WIPO, 14 pages.
European Patent Office, Extended European Search Report Issued in Application No. 22796559.7, Jul. 10, 2025, 31 pages.

* cited by examiner

Mechanism

Polish Schematic

FIG. 3

Mechanism

Regeneration Schematic

┌─────────────────────────────────────────────────────────────────────┐
│ POLISH A SUBSTRATE MATERIAL WITH A FUNCTIONALIZED CHEMICAL          │
│ PLANARIZATION PAD 702                                               │
│ ┌─────────────────────────────────────────────────────────────────┐ │
│ │ THE SUBSTRATE MATERIAL INCLUDES ONE OR MORE OF COPPER, COBALT,  │ │
│ │ GOLD, HAFNIUM, ZIRCONIUM, RHENIUM, NIOBIUM, MOLYBDENUM,         │ │
│ │ RUTHENIUM, TANTALUM, VANADIUM, TUNGSTEN, TAN, TIN, POLYSILICON, │ │
│ │ OR SILICON 704                                                   │ │
│ └─────────────────────────────────────────────────────────────────┘ │
└─────────────────────────────────────────────────────────────────────┘
                                   │
                                   ▼
┌─────────────────────────────────────────────────────────────────────┐
│ REGENERATE THE PAD BY APPLYING A REGENERATION SOLUTION              │
│ CONFIGURED TO BREAK BONDS BETWEEN THE FUNCTIONAL GROUPS AND         │
│ SUBSTRATE MATERIAL BONDED TO THE FUNCTIONAL GROUPS TO FORM          │
│ REMOVED MATERIAL 706                                                │
│ ┌─────────────────────────────────────────────────────────────────┐ │
│ │ REACT THE SUBSTRATE MATERIAL WITH A STRIPPING AGENT CONFIGURED  │ │
│ │ TO BREAK THE BONDS BETWEEN THE FUNCTIONAL GROUPS AND THE        │ │
│ │ SUBSTRATE MATERIAL 708                                          │ │
│ │ ┌─────────────────────────────────────────────────────────────┐ │ │
│ │ │ REACT THE SUBSTRATE MATERIAL WITH DISSOLVED COMPLEXING      │ │ │
│ │ │ AGENT 710                                                    │ │ │
│ │ └─────────────────────────────────────────────────────────────┘ │ │
│ └─────────────────────────────────────────────────────────────────┘ │
│ ┌─────────────────────────────────────────────────────────────────┐ │
│ │ FORM A METAL OXIDE 712                                          │ │
│ └─────────────────────────────────────────────────────────────────┘ │
└─────────────────────────────────────────────────────────────────────┘
                                   │
                                   ▼
┌─────────────────────────────────────────────────────────────────────┐
│ COMPLEX THE REMOVED MATERIAL IN DISSOLVED COMPLEXING AGENT TO       │
│ FORM DISSOLVED MATERIAL IN AN EFFLUENT PHASE 714                    │
│ ┌─────────────────────────────────────────────────────────────────┐ │
│ │ COMPLEX THE REMOVED MATERIAL WITH ONE OR MORE OF A HYDROXIDE,   │ │
│ │ AN ALCOHOL, AN ACID, AN AMINE, AN AZOLE, A MACROCYCLIC COMPOUND,│ │
│ │ A SULFONATE, A SULFITE ESTER, POLY-DADMAC, MONO-DADMAC, A       │ │
│ │ PERSULFATE, AMMONIA, EDTA, DTPA, NTA, ETHYLENE DIAMINE, AN AMINO│ │
│ │ ACID, IDS, EDDS, GLDA, OR MGDA 716                              │ │
│ └─────────────────────────────────────────────────────────────────┘ │
└─────────────────────────────────────────────────────────────────────┘
                                   │
                                   ▼
                         ┌──────────────────┐
                         │   TO FIG. 7B     │
                         └──────────────────┘

PAD SURFACE REGENERATION AND METAL RECOVERY

CROSS-REFERENCE TO RELATED APPLICATION

This application claims priority to U.S. provisional application No. 63/179,995 entitled NOVEL METHODOLOGY FOR REGENERATION AND RECOVERY OF SPECIES IN AN ENHANCED PLANARIZATION PROCESS, filed Apr. 26, 2021, the entire contents of which are hereby incorporated by reference for all purposes.

BACKGROUND

Eliminating defects during planarization of multiple metal and dielectric layers in logic, memory and other semiconductor devices becomes increasingly important as nodes in such devices are miniaturized, as the risks posed by defects can increase with decreasing feature size. In some instances, defects can be reduced by utilizing abrasive-free or reactive aqueous solutions to achieve planarization using reactive or functionalized pad structures that obviate the use of abrasive particles during planarization. However, it can be challenging to maintain continuous high-level performance from such pads, as the reactivity of each pad may degrade as atoms in metal and dielectric layers of a polished substrate become bound to reactive entities in the pad.

SUMMARY

To address the issues discussed above, in one example, a method is provided for using a functionalized chemical planarization pad in planarization processes. The method comprises planarizing a substrate material with the functionalized chemical planarization pad. The functionalized chemical planarization pad includes a plurality of functional groups bonded to a material of the pad. The functional groups are configured to chemically react with the substrate material such that a portion of substrate material bonds to the functional groups. The method further comprises regenerating the pad by applying a regeneration solution configured to break bonds between the functional groups and substrate material bonded to the functional groups to form removed material. The removed material is complexed in a dissolved complexing agent to form dissolved material in an effluent phase.

Another example provides a method for recovering metal species in a planarization process. The method comprises receiving, from the planarization process, a liquid effluent phase including a removed metal substrate material complexed to a complexing agent. The dissolved material is extracted into a liquid extraction phase. The removed metal substrate material is recovered from the liquid extraction phase.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Chemical mechanical planarization (CMP) is commonly used in integrated circuit fabrication processes to smooth surfaces, such as that of a semiconductor substrate, by removal of material using a combination of chemical and mechanical forces. A typical CMP process involves using an abrasive and a chemical slurry that may or may not be corrosive to the material being removed, in combination with a planarization pad. The substrate and planarization pad are pressed together, and rotated relative to one another with non-concentric axes of rotation. The combination of the force and slurry removes areas of the substrate with a higher topology compared to areas with a lower topology, thereby smoothing the surface.

While current methods of CMP find use in a wide variety of device fabrication contexts, current CMP methods also pose various drawbacks. For example, current CMP processes are relatively dirty compared to other fabrication processes, due at least in part to the use of a pad conditioner, as well as the abrasive slurry and pad that mechanically abrade the material during planarization. Defects generated by CMP can be large yield loss contributors to fabs. Defects and scratches generated during CMP may largely originate from the mechanical components in the process, such as the abrasives in the slurry, the force of the pad against the substrate, debris from pad conditioning, and tribological aspects of the process. Further, the slurry contains abrasives that can scratch device layers, thereby creating pits and leaving residues that can become defects. Additionally, pad debris is generated during polish and pad conditioning. Such pad debris can create particles and agglomerates that contaminate the substrate being processed. Also, the force of the pad against the wafer can cause pad deformation. This can result in shear stresses at interfaces from intimate contact with the substrate and relative motion between the substrate and pad. Further, CMP processes may not be predicable, and thus may be dominated by trial-and-error approaches, rather than analytical approaches. Further still, the handling, delivering and stabilization of slurries can pose difficulties for fabrication facilities due to solid content. This can increase facilities maintenance costs. Owing to the inefficiency in the process for planarization, conventional CMP processes can require redundancy in deposition and overplanarizing, which can lead to wasted resources, increased costs, and lower productivity.

To avoid such issues, planarization may be performed chemically, without the dirty and defect-prone mechanical processes used in conventional CMP methods. Briefly, an abrasive-free planarization solution may be used instead of an abrasive slurry to selectively remove material from topographically higher portions of a substrate at a higher rate than from lower portions of a substrate by controlled contact of the planarization solution to the substrate surface. The term "abrasive-free" indicates a planarization solution without a mechanically abrasive solid component for removing substrate material. The planarization solution may comprise chemical components to hydrolyze a substrate material (e.g. by oxidation and dissolution). The planarization solution may be configured to remove any suitable materials. As one example, polysilicon may be removed via a planarization solution comprising poly(diallyldimethylammonium chloride) (PDADMAC) in deionized water. In some such examples, the PDADMAC solution may be mixed with oxalic acid and/or hydrogen peroxide, and further may comprise a suitable acid or alkaline agent (e.g. nitric acid or potassium hydroxide) to adjust the pH. Other reagents also may be used to planarize polysilicon, including but not limited to poly(dimethylamine-co-epichlorohydrin-co-ethylenediamine), poly(allylamine), and poly(ethylene imine) (PEI). In other examples, copper or cobalt may be removed using a planarization solution comprising hydrogen peroxide and guanidine carbonate, again with pH adjusters to achieve a desired solution pH. As another example, ammonium persulfate may be used for cobalt removal, with pH adjusters to achieve a desired solution pH. Other examples of suitable hydrolyzing agents may include, but are not limited to, nitric acid, sulfuric acid, hydrochloric acid, and phosphoric acid. In some examples, the planarization solution may comprise additional components. For example, the planarization solution may comprise complexing/chelating agents to transport removed material from the substrate after hydrolysis. Examples of suitable chelating agents may include, but are not limited to, ethylenediaminetetraacetic acid (EDTA), sulfosalicylic acid, napthol (PAN), dithizone, organophosphorus acid esters, polyethylene glycol, amines, and thioxine. Further, in some examples, the planarization solution may comprise passivating agents and/or corrosion inhibitors. Examples include, but are not limited to, benzatriazoles (BTA), tolyltriazoles (TTA), thiols (e.g. PTAT (5-(phenyl)-4H-1,2-4-triazole-3-thiol)), thiodiazoles, carboxylic acids, benzoic acid, and ammonium benzoate. Other examples of materials that may be included in the planarization solution include, but are not limited to, surfactants, surface modifiers other than passivation and/or corrosion inhibitors, catalysts, thermally activated chemicals, light activated chemicals, species tracers, additives, and stabilizers. As described in more detail below, in some examples the abrasive-free planarization chemistry resides in a porous pad, rather than on top of the pad between the pad and substrate. In this manner, the substrate can be controlled to contact topologically higher features of the substrate to the porous pad, and not contact topologically lower features of the substrate. Planarization chemistry is exposed to portions of the substrate in contact with the porous pad, thereby selectively removing material from those portions of the substrate. In this manner, the topology of the substrate surface may be made smoother without using abrasives, and by applying only relatively light pressure against the substrate. This may help to avoid scratching or otherwise damaging the device layer, thereby helping to avoid defects and potentially improving yields over conventional CMP processes.

Further, a chemical planarization pad may be configured to retain removed substrate species as bonded to functional groups on the pad. Retention of removed substrate species helps to remove the removed substrate species from the substrate surface. However, over time, the bonding of substrate species to the functional groups on the pad surface may result in pad glazing, which can impact pad performance.

Accordingly, examples are disclosed that relate to regenerating a chemical planarization pad by dissociating substrate species that are bound to the pad. Briefly, the pad is regenerated by applying a regeneration solution configured to break bonds between the functional groups and substrate material bonded to the functional groups to form removed material. The removed material is complexed in a dissolved complexing agent to form dissolved material in an effluent phase. This process revives the pad, allowing its continued use without loss of productivity or functionality and extending pad lifetime. In addition, the removed material may be recovered from the effluent phase, cleaning the effluent phase and enabling recycling of potentially valuable materials.

Figure 1:
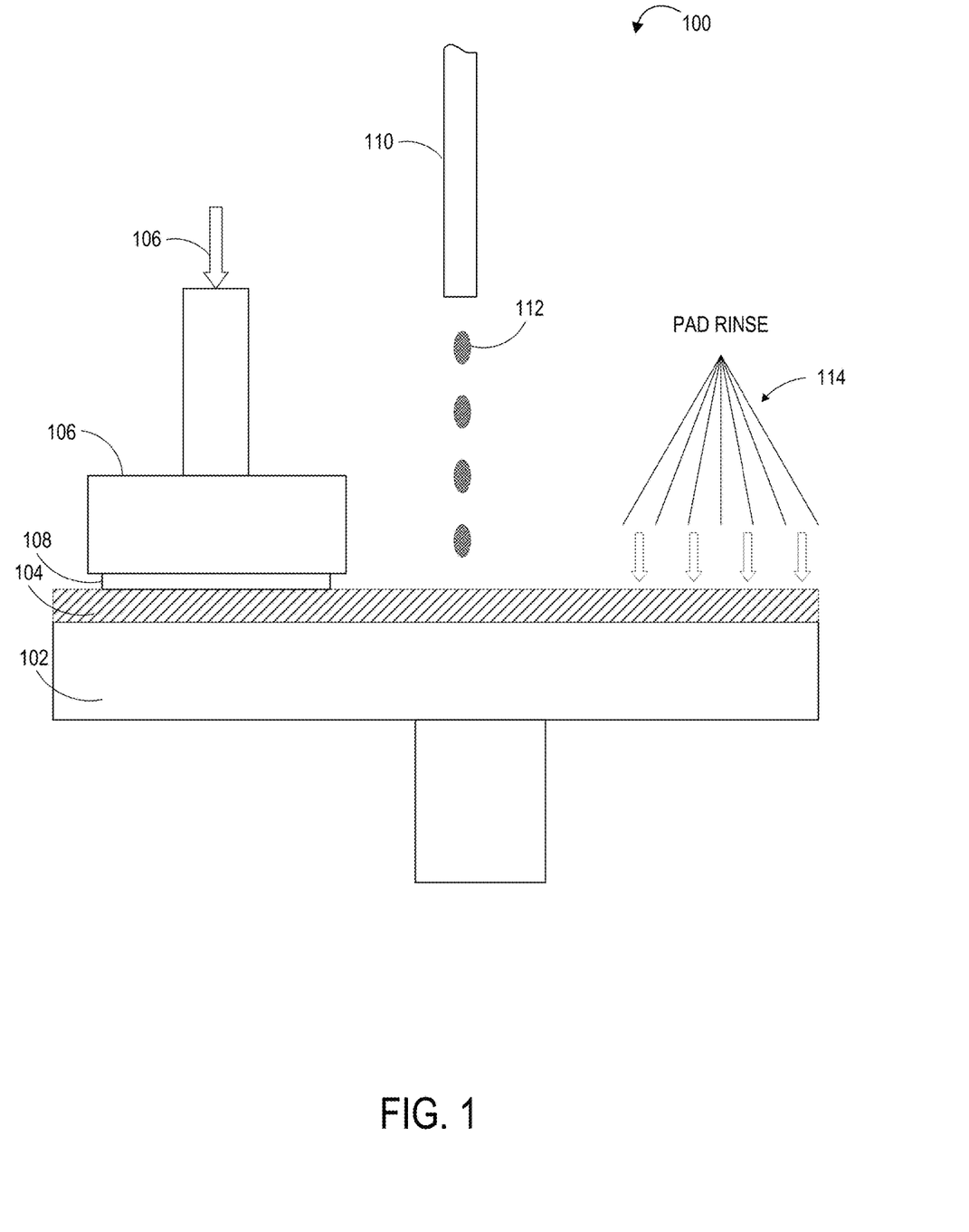
FIG. 1 shows a block diagram of an example chemical planarization system.

Prior to discussing examples of pad regeneration and materials recovery, FIG. 1 shows a schematic depiction of an example chemical planarization system 100 according to the present disclosure. System 100 comprises a platen 102 that supports a porous pad 104. The system 100 further includes a substrate holder 106 configured to hold a substrate 108 against the surface of the porous pad 104, and a planarization solution introduction system 110 for introducing a planarization solution 112 onto the porous pad 104. The system 100 further may comprise a pad rinsing system 114 configured to rinse possible contaminant materials from the porous pad 104, such as complexed materials that have been removed from the surface of the substrate 108. Pad rinsing system 114 also may be used to clean the pad between using different planarization solution chemistries. Other components that may be incorporated into system 100 include, but are not limited to, a spent solution recovery system, a materials recirculation system (e.g. for recirculating the planarization solution in a closed loop process), and a species stripping system. Additional aspects of the chemical planarization system 100 are described in more detail in U.S. patent application Ser. No. 15/931,556, entitled CHEMICAL PLANARIZATION, the entire contents of which are hereby incorporated by reference in its entirety for all purposes.

Figure 2:
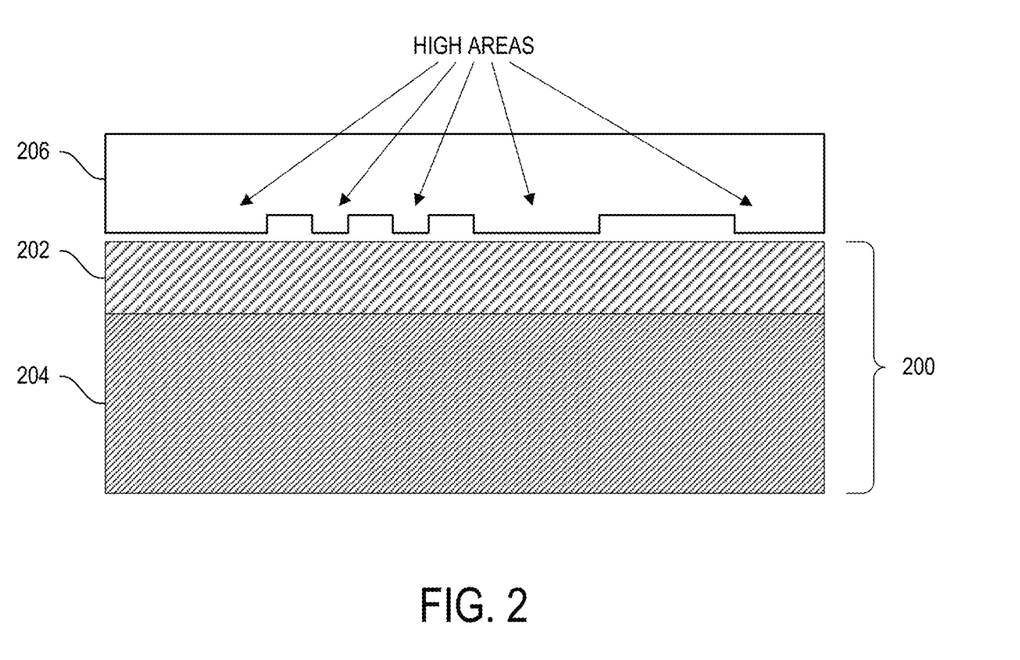
FIG. 2 shows a schematic depiction of an example porous pad for performing chemical planarization, and illustrates contact between topologically higher portions of a substrate and an upper layer of the pad.

FIG. 2 shows a schematic view of an example porous pad 200 that is suitable for use as porous pad 104. The porous pad 200 includes a first layer 202 and a second layer 204. Such a dual layer structure may be used to implement a two-part material removal and separation process, wherein the first step comprises a hydrolysis (and potential dissolution) of the species being removed, and the second step comprises a chemical complexation of the species. The first layer 202 may be relatively thin compared to the second pad, and may be configured for hydrolysis (e.g. oxidation of metal species in some examples) of materials being removed in the planarization process. As such, the first layer 202 may comprise relatively larger pores, may be hydrophilic, and may be surface modified to functionalize the polymer surface, thereby allowing the polymer of the first layer 202 to participate in hydrolysis reactions with a substrate 206. The first and second layers may be made from any suitable material or materials. In some examples, the first layer 202 and/or the second layer 204 may comprise one or more of polyurethane, polycarbonate, polyacrylate, polysulfone, polyester, polyacrylonitrile, polyethersulfone, polyarylsulfone, polyacrylonitrile, or polyvinylidene fluoride.

Figure 3:
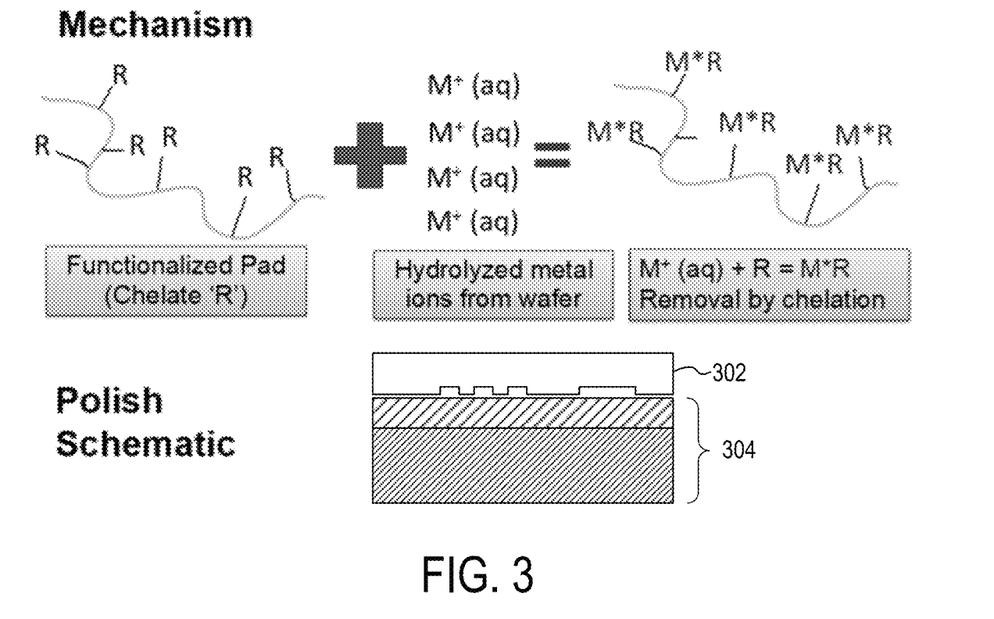
FIG. 3 shows a schematic diagram of an example mechanism for planarizing a material with a pad surface including a plurality of functional groups configured to react with and remove at least a portion of the material.

FIG. 3 shows a schematic diagram depicting an example of planarizing a substrate material 302 with a functionalized chemical planarization pad 304. The functionalized chemical planarization pad 304 is an example of the porous pad 200 of FIG. 2. The functionalized chemical planarization pad 304 may be used to polish any suitable substrate material, such as transition metals, refractory metals, and dielectric materials. Some examples of suitable substrate materials include, but are not limited to, copper, cobalt, gold, hafnium, zirconium, rhenium, niobium, molybdenum, ruthenium, tantalum, vanadium, tungsten, TaN, TiN, polysilicon, silicon, silicon dioxide, silicon nitride, and silicon carbide.

The functionalized chemical planarization pad 304 comprises a plurality of functional groups "R" bonded to a material of the pad 304. Any suitable method may be used to functionalize the polymers of the porous pad. In some examples, the polymer may be functionalized by coating, in which the functional groups are not cross-linked to the polymer substrate, but instead adsorbed. In another example, the functional group may be cross-linked. For example, a crosslinked co-polymer can be precipitated onto the porous polymer matrix of the porous pad. As yet another example, the functional group could be covalently bonded to the polymer. The functional groups R are configured to chemically react with the substrate material 302 such that a portion of substrate material 302 bonds to the functional groups R. In some examples, the functional groups R include one or more of carboxyl, amino, and hydroxyl groups that are bound to molecules (e.g., polymer chains) that form the pad 304. It will also be appreciated that the functional groups R may include any other suitable functional groups, such as a sulfonyl group. As introduced above, the functional groups R enable the substrate surface to be smoothed without using abrasives. However, in some instances, a portion of the substrate material binds to the functional groups, which may cause pad reactivity to decrease and can also lead to pad glazing, as mentioned above.

Figure 4:
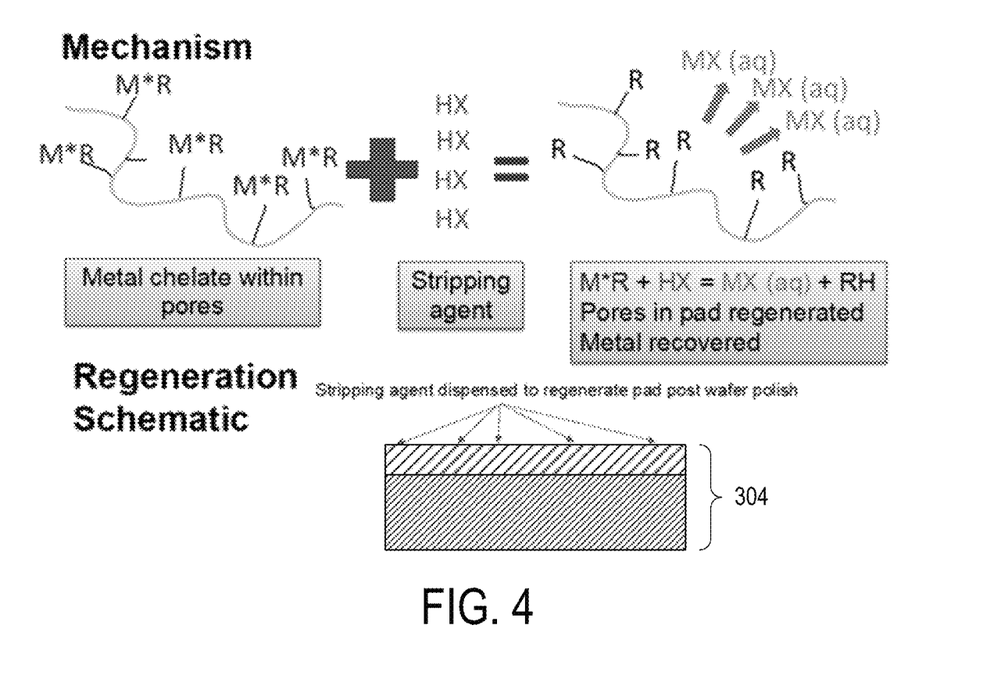
FIG. 4 shows a schematic diagram of an example mechanism for separating material from the pad surface of FIG. 1.

Accordingly, and with reference now to FIG. 4, the functionalized chemical planarization pad 304 is regenerated by applying a regeneration solution (e.g., HX) configured to break bonds between the functional groups R and substrate material 302 (e.g., M) to form removed material (e.g., MX). The removed material is complexed in a dissolved complexing agent to form dissolved material in an effluent phase. In this manner, the regeneration solution is configured to strip the substrate material from the functionalized chemical planarization pad. In some examples, the regeneration process is carried out when the wafer being planarized is removed from the polishing tool and is not contact with the functionalized pad.

In some examples, the regeneration solution includes a stripping agent configured to remove the substrate material from the functionalized chemical planarization pad via oxidation and/or hydrolysis. Some examples of suitable stripping agents include, but are not limited to, a peroxide (e.g., hydrogen peroxide), HCl, HNO$_3$, sulfuric acid, ammonium hydroxide, sodium hydroxide, and potassium hydroxide as well as any of the many known amino acids. For example, a metal substrate material (e.g., a metallic copper atom) bound to one of the functional groups R may be removed by forming a metal oxide (e.g., CuO or Cu$_2$O) from the metal. Oxidation of the metal may also be possible by reacting the surface of the functionalized chemical planarization pad 304 with acids or alkalis without degrading the surface.

Some examples of suitable complexing agents include, but are not limited to, a hydroxide, an alcohol, an acid, an amine, an azole, a macrocyclic compound (e.g., cyclodextrins), a sulfonate, a sulfite ester, poly-diallyldimethylammonium chloride (DADMAC), mono-DADMAC, and persulfates (e.g., ammonium persulfate, potassium persulfate). Some examples of suitable acids include, but are not limited to, carboxylic acids (e.g., acetic acid, oxalic acid, citric acid, nicotinic acid, and picolinic acid), and stronger acids such as HCl, HNO$_3$, and sulfuric acid. Some examples of suitable amines include, but are not limited to, ammonia, ethylenediaminetetraacetic acid (EDTA), diethylenetriaminepentaacetic acid (DTPA), nitrilotriacetic acid (NTA), ethylene diamine, and amino acids (e.g., glycine, cysteine). Some examples of suitable hydroxides include ammonium hydroxide, sodium hydroxide, and potassium hydroxide. Some examples of suitable azoles include 1,2,4-triazole and its derivatives. In yet other examples, the complexing agent comprises a biodegradable compound. Some examples of suitable biodegradable complexing agents include, but are not limited to, iminodisuccinic acid (IDS), ethylenediaminedisuccinic acid (EDDS), glutamic acid diacetate (GLDA), and methylglycinediacetic acid (MGDA). These biodegradable complexing agents may be derived from renewable sources and have relatively safer toxicological and ecological profiles than other examples of organic and inorganic complexing agents. Two example Cu complexation/dissolution reactions are as follows.

$$Cu_2O + 4NH_3 + H_2O = 2Cu(NH_3)_2^+ + 2OH^-$$

$$CuO + 4NH_3 + H_2O = Cu(NH_3)_4^{2+} + 2OH^-$$

In other examples, complexing the removed material comprises chelating the removed material with a chelating agent. Some examples of suitable chelating agents include but are not limited to, EDTA, amino acids (e.g., glycine and serine), and ethylene diamine. Glycine can exist in different forms depending on pH (pH is indicated above each arrow):

The neutral NH$_2$ group and the COO$^-$ groups in the alkaline region and the COOH groups at lower pH values may enable this amine to stabilize substrate material ions (e.g., copper ions) over a relatively large pH range.

Similarly, ethylene diamine can exist in different forms depending on pH (pH is again shown above each arrow):

The two neutral NH$_2$ groups present at higher pH values can solubilize Cu.

Exposure to a solution including one or more of these reactive species may separate and/or sequester the substrate material from the functional groups, thereby restoring the functionalized chemical planarization pad and enabling continued use of the functionalized chemical planarization pad. It will also be appreciated that the complexing agent(s) may be provided in the regeneration solution contemporaneously with the stripping agent(s), or in a second process step following application of the stripping agent(s). In other examples, the complexing agent(s) serve as the stripping agent(s) or vice versa. It will also be appreciated that the process of stripping and complexing the removed material may be performed any suitable number of times, and/or repeated at any suitable frequency, based upon a rate of material removal from the substrate.

After planarizing the substrate material, removing the substrate material from the functional groups, and/or complexing the removed material, the effluent phase may include a low concentration (e.g., approximately 5-100 mg/L in some examples) of the removed substrate material. Fabricating 30,000 wafers (200 mm equivalent) per day may produce approximately 300,000 gallons of effluent each day, as an example. Some of the removed materials in this effluent are valuable (e.g., Cu, Au). Furthermore, it can be challenging to safely dispose of effluent containing such concentrations of the removed material. As the chemical planarizing methods disclosed herein are devoid of abrasives, the effluent is a relatively cleaner mixture than conventional CMP effluent, which may allow extraction of the removed material leading to higher purity levels in the effluent compared to conventional CMP.

In various examples, the dissolved material is extracted from the effluent phase via liquid-liquid extraction and/or solvent extraction. The liquid-liquid extraction or solvent extraction methods are 2-step processes in which an organic and the effluent (e.g., aqueous) phases execute selective extraction in a first step process, followed by stripping where the species is selectively captured in a stripping phase (e.g., another aqueous phase).

As an example, the recovery of copper may be achieved with the use of a suitable extraction solution. Some examples of suitable extraction solutions include, but are not limited to, LIX64 and LIX64N provided by BASF SE of Ludwigshafen, Germany, KELEX 100 and KELEX 120 provided by Ashland Global Specialty Chemicals Inc. of Wilmington, Delaware, and phosphonates. Other examples of suitable extraction solvents include, but are not limited to, ALAMINE 308, ALAMINE 336, and ALAMINE 304, provided by BASF SE of Ludwigshafen, Germany and ALIQUAT 336 provided by Henkel AG & Co. KGaA of Dusseldorf, Germany. These media have a high extraction ability for copper and thus facilitate efficient copper removal in suitable pH conditions and optionally in the presence of other additives. Solvents may include organic phases such as kerosene containing complexing agents such as LIX and KELEX as mentioned above. This in turn may be removed from the solvent in a subsequent stripping step to further recycle the solvent through a solvent extraction unit (or similar equipment and methodology, as employed in hydrometallurgy or the chemical industry). Similar extraction and stripping may be achieved for other metals such as cobalt, gold and refractory metals such as hafnium, zirconium, molybdenum, ruthenium, rhenium and other rarer metals such as columbium, tantalum, and rare earths such that may be of interest to the semiconductor industry.

In some examples, a small quantity of an active solvent component (e.g., an organic chemical) is dissolved in a second organic liquid called the diluent. In some examples, the active solvent component comprises one or more of an amine, an alkyl phosphoric acid, or a sulfonate. The amines act by forming an organic soluble salt with anions whereas the alkyl phosphoric acids react with cations. In some examples, the diluent comprises kerosene or another hydrocarbon that is inert towards the dissolved material (relative to the active solvent component). The diluent, which may comprise 70-95 percent of the solution, serves as a carrier for the active solvent component.

During the extraction operation, the active component reacts chemically with the desired ions in the aqueous feed forming a new compound which is soluble in the inert diluent, or carrier. The active organic material attaches itself to the desired metallic ion and then retreats into the kerosene or other solvent, bringing the metallic ion with it. In this way, a great deal of selectivity may be achieved by changing the nature and characteristics of the organics involved. Extraction of uranium by amines is an example of this kind of solvent extraction. Likewise, thorium using tributyl phosphate (TBP) is another example as used in the nuclear field.

In some examples, the solvent extraction solution further comprises a modifier. Some examples of suitable modifiers include, but are not limited to, di-butyl-butyl phosphonate, phosphine oxide, tributyl phosphate, and isopropyl alcohol. These compounds may increase the extracting power, selectivity, and phase separation of the solvent. Addition of modifiers may also prevent the formation of some insoluble compounds in the organic phase. For example, the addition of alcohol may help depress the formation of molybdenum amine solid precipitates in the organic phase in molybdenum extraction. The addition of tributyl phosphate to dimethyl hexyl phosphoric acid will prevent the formation of insoluble sodium di-2-ethyl-hexyl phosphate.

In other examples, extracting the dissolved material via the solvent extraction comprises extracting the dissolved material via an ion pair extraction. In this methodology, the entire organic phase acts as a solvent for some component of an aqueous phase (e.g., the effluent) which is soluble in both water and in the organic phase. This results in the extraction of a neutral molecule (ion-pair) by preferential solubility. One example of an ion pair extraction is the separation of tantalum and columbium from hydrofluoric acid with hexone. Ion pair extraction may be implemented in situations where it is feasible to add a suitable material, such as thiocyanate, to the effluent. The added material forms a compound with the removed substrate material that renders the removed substrate material soluble in the organic phase.

In yet other examples, recovering the dissolved material includes extracting the dissolved material via membrane separation (e.g., via a liquid membrane (LM) system or a surfactant liquid membrane (SLM) system). Membrane separation includes both extraction and stripping in a single step. This may be particularly useful for small size separation reactors or operations where trace metal quantities are involved, requiring high extraction and separation efficiency. Membrane separation may yield higher purity levels than other extraction techniques (e.g., liquid-liquid extraction or solvent extraction), which enables closed-loop recycling of spent chemicals.

In a supported LM system, the extracting phase (organic) is embedded and immobilized within a solid porous matrix (membrane/polymeric material that's non-reactive and primarily a support structure for the organic phase). An immobilized or supported membrane separates the effluent phase from the stripping (receiving) phase. One interface between the membrane and the effluent (e.g., aqueous) phase represents the extraction process. The other interface represents the recovery process, which also may be referred to as stripping. The organic phase within the LM framework is the extractant and the carrier that chemically reacts/dissolves the metal species at the one end and transfers/releases the metal species into the stripping phase.

In a SLM system, water/organic (W/O) and organic/water (O/W) interfaces are generated in a water/organic/water multi-phase emulsion. This results in extraction and stripping occurring contemporaneously in a single step. The extraction occurs at an outer W/O interface, and the stripping occurs at an inner O/W interface. The reaction can be controlled by selecting the composition of the organic and the stripping phases. Redox reactions may be additionally or alternatively controlled by tuning the pH of the system components, as the redox reactions may release and consume protons.

Figure 5:
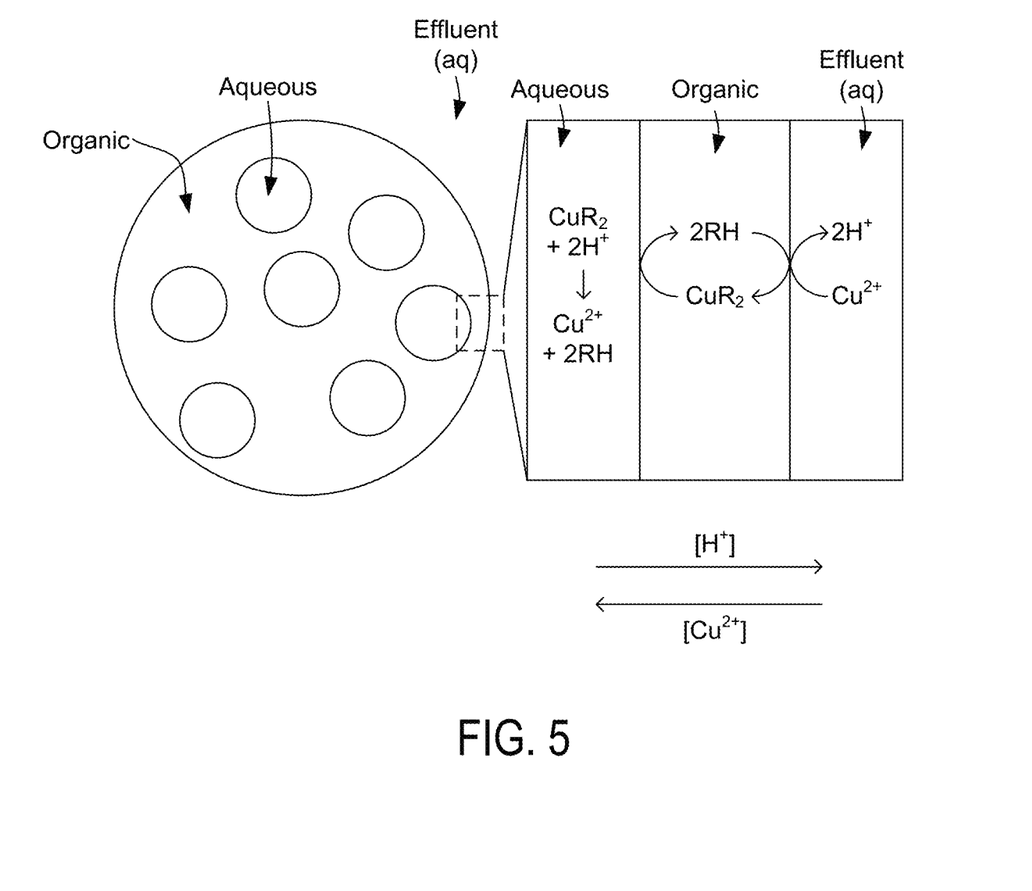
FIG. 5 shows a schematic diagram of an example mechanism for extracting substrate material from an effluent phase that can be used to recover substrate material in the chemical planarization system of FIG. 1.

FIG. 5 is a schematic illustration of an example SLM system in which an organic phase is dispersed in an aqueous phase. A resulting emulsion (W/O) is stabilized by surfactants. This enables better control over the separation process relative to other extraction methods (e.g., liquid-liquid extraction or solvent extraction) by manipulating the size of the droplets of the dispersed phase. The smaller the droplets, the larger the surface area and thus the rate of separation. The chemistry of separation may be determined by an active chemical reagent in the organic phase. In this scheme, the extraction is a first separate step. Once extraction is completed, the emulsion is broken to separate out the two phases. By then, all the removed substrate material (e.g., metal species) is extracted into the organic phase. In a separate step, a similar O/W emulsion is devised (which may include surfactants, additives, stabilizers, etc.) that strips the metal species from the organic phase into a stripping phase (e.g., another aqueous phase). Further phase separation (via breaking of the emulsion) recovers the organic phase for re-use. This is similar to solvent extraction, except the separation is enhanced by dispersing one phase into another to increase interface surface area between the phases. Contacting the aqueous and organic phases may be performed in any suitable manner, such as via a mixer, packed beds, columns, etc. Similarly, phase separation may be achieved via gravity based on density separation or thermal breakdown.

In some examples, the effluent comprises two or more different metal species, which are extracted in a tiered recovery approach. A first metal species is extracted in a first extraction stage, while a second metal species remains in the effluent. The second metal species is extracted from the effluent in a second extraction stage. For example, nickel and copper may be coextracted from the effluent phase using LIX64N. The nickel and copper may be separated and concentrated by selective stripping. However, cobalt (e.g., cobalt(III)) is not extracted by LIX64N and remains in the raffinate. The cobalt may be extracted from a sulfate solution via solvent extraction at a pH in the range of 5-6.5 or 11-12. Alkaline solutions for the cobalt extraction phase have a concentration of less than or equal to 40 g/L ammonium sulfate. In other examples, such as in semiconductor applications of CMP, cobalt concentrations may be sufficiently low to safely dispose of the raffinate.

In other examples, metal ions other than cobalt, such as Ni and Zn ions, can be extracted from the effluent. Nickel may be almost completely extracted by LIX64N prior to cobalt solvent extraction. For solutions including approximately 0.01 g/L Ni and less than 0.001 g/L Cu, selective extractions occur that enable separation. For example, Zn is crowded (displaced) from LIX64N by Ni and Cu loading. Therefore, zinc will remain in the nickel-copper raffinate. A small bleed stream may be used to control nickel levels in the raffinate. In some examples, the level of zinc in the raffinate is controlled by crowding Zn from the solvent via cobalt loading. In other examples, the zinc is extracted from the raffinate with di-(2-ethylhexyl)phosphoric acid (D2EHPA) and recovered as crystallized zinc sulfate.

Figure 6:
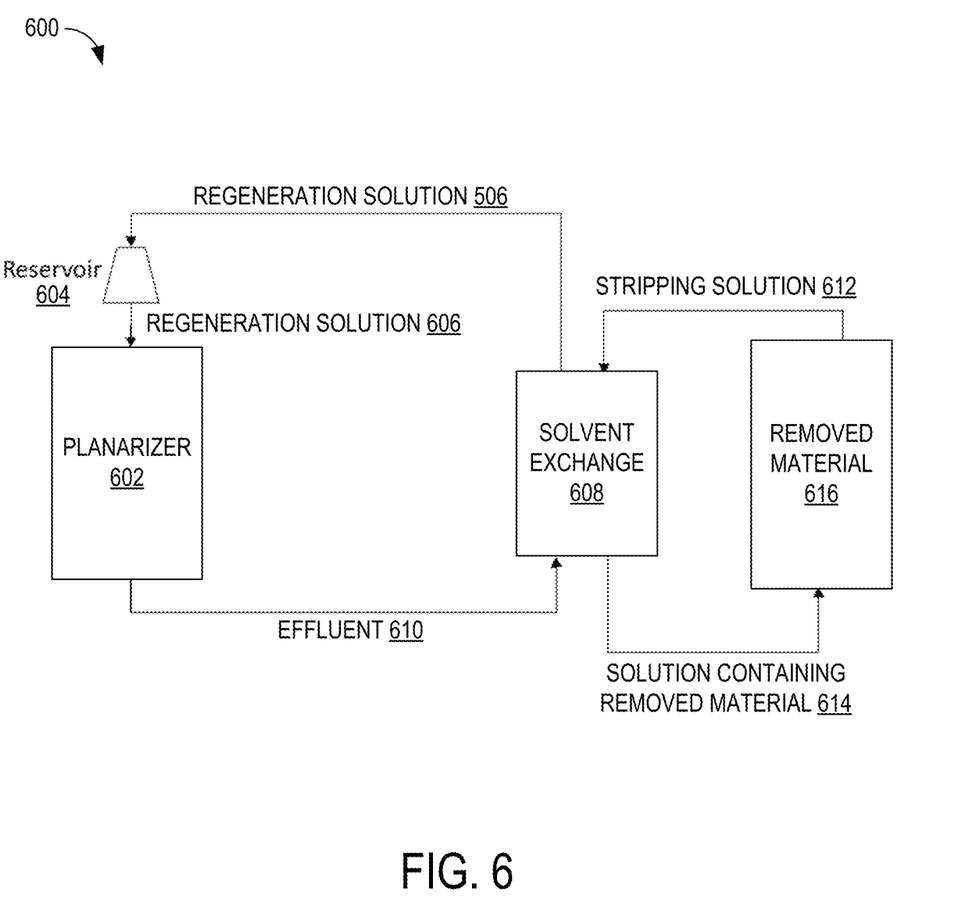
FIG. 6 shows a schematic diagram of an example system for planarizing a material with a pad surface, regenerating the pad, and recovering metal species removed from the material by the pad surface, which may be used to implement the example mechanisms of FIGS. 3 and 4.

FIG. 6 shows a schematic diagram of an example system 600 for planarization, regeneration, and recovering removed species and spent chemicals. The system 600 includes a chemical planarizer 602. The chemical planarizer 602 includes a functionalized chemical planarization pad (e.g., the porous pad 104 of FIG. 1, the porous pad 200 of FIG. 3, or the functionalized chemical planarization pad 304 of FIGS. 3-4) operatively configured to polish a substrate material (e.g., the substrate 108 of FIG. 1, the substrate 206 of FIG. 2, or the substrate material 302 of FIG. 3).

The system 600 further includes a regeneration solution reservoir 604 upstream of the chemical planarizer 602. The regeneration solution reservoir 604 is operatively configured to introduce a regeneration solution 606 into the chemical planarizer 602 to thereby separate removed material from a surface of the functionalized chemical planarization pad as described above. A solvent exchanger 608 is located downstream of the planarizer 602. The solvent exchanger 608 is operatively configured to receive effluent 610 from the planarizer 602 and to recover the removed material from the effluent phase. The removed material is stripped from the effluent in a stripping solution 612 as described above. The stripping solution including the removed material 614 is processed to extract the removed material at 616. Accordingly, and in one potential advantage of the present disclosure, extraction efficiencies and purities may be sufficiently high to recycle the regeneration solution 606 and/or the stripping solution 612 in a closed-loop system.

Figure 7A:
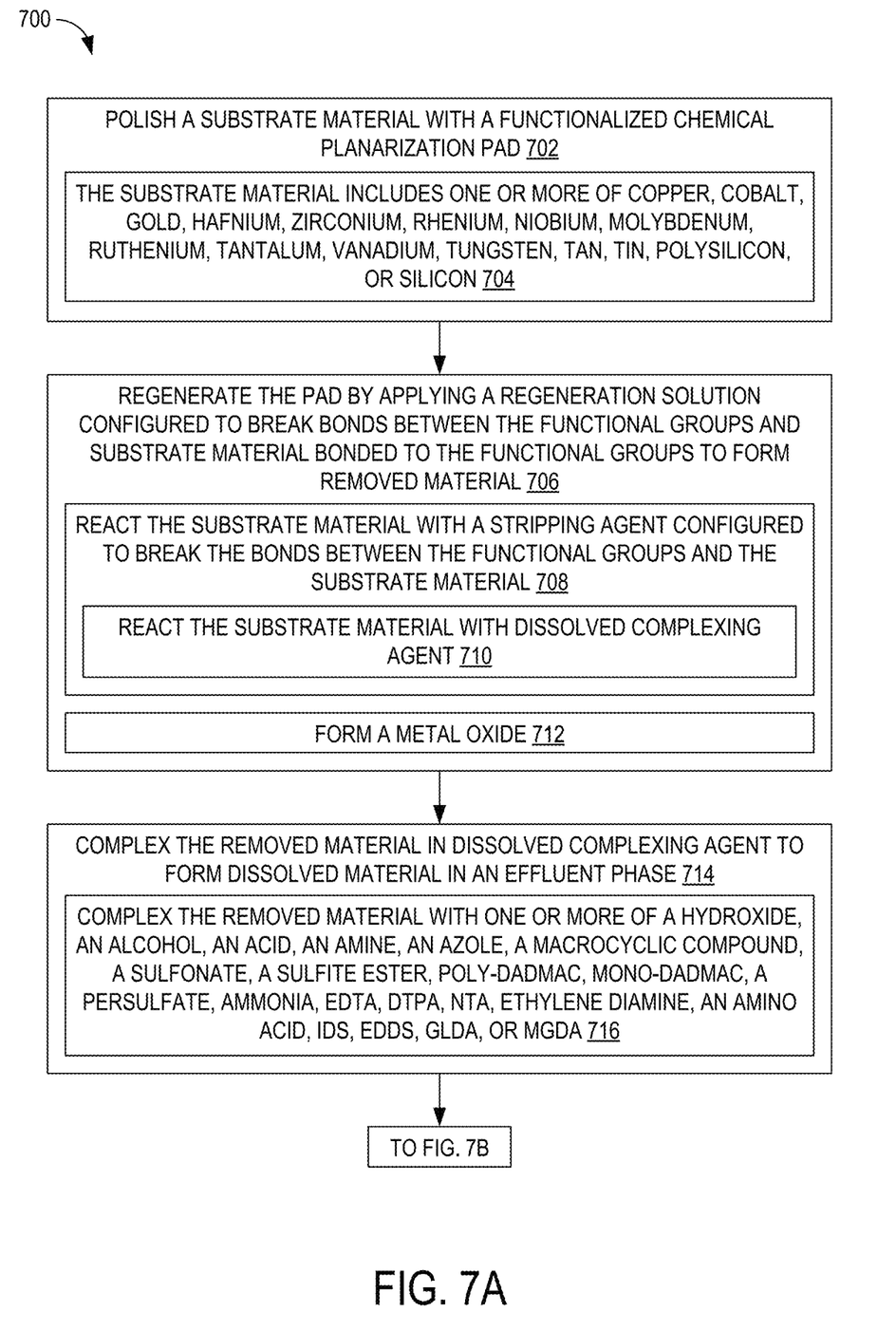
FIGS. 7A-7B show a flowchart of an example method for using a functionalized chemical planarization pad in planarization processes according to an example embodiment of the subject disclosure.
Figure 7B:
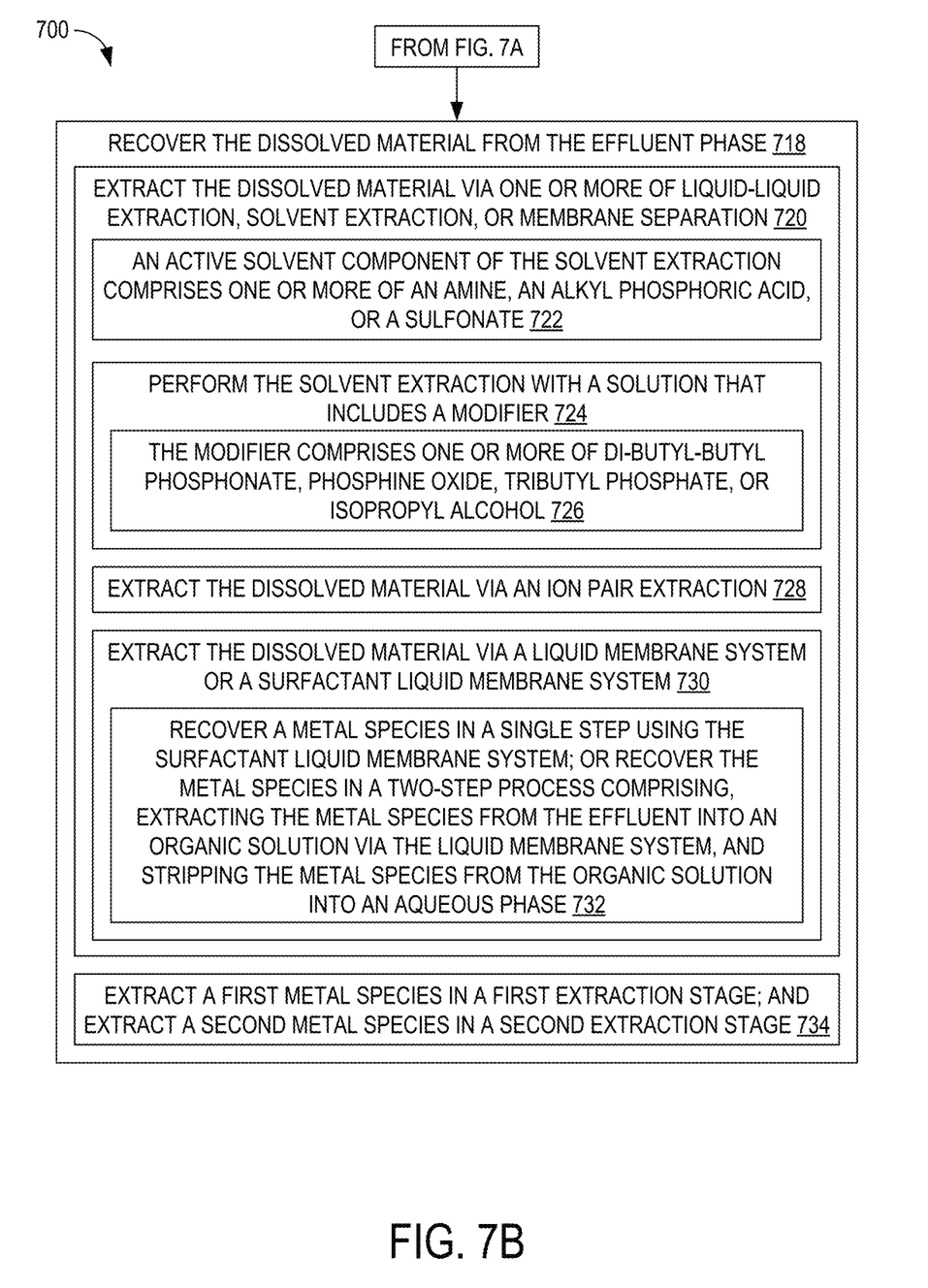

Referring now to FIGS. 7A-7B, a method 700 is provided for using a functionalized chemical planarization pad in planarization processes. The following description of the method 700 is provided with reference to the software and hardware components described above and shown in FIGS. 1-6. It will be appreciated that the method 700 also may be performed in other contexts using other suitable hardware and software components.

At step 702 in FIG. 7A, the method 700 includes planarizing a substrate material with the functionalized chemical planarization pad. The functionalized chemical planarization pad including a plurality of functional groups bonded to a material of the pad. The functional groups are configured to chemically react with the substrate material such that a portion of substrate material bonds to the functional groups. For example, the functionalized chemical planarization pad 304 of FIG. 3 is configured to react with the substrate material 302, such that a portion of the substrate material (M) bonds to the functional groups (R). In some examples, as indicated at 704, the substrate material includes one or more of copper, cobalt, gold, hafnium, zirconium, rhenium, niobium, molybdenum, ruthenium, tantalum, vanadium, tungsten, TaN, TiN, polysilicon, or silicon.

At 706, the method 700 includes regenerating the pad by applying a regeneration solution configured to break bonds between the functional groups and substrate material bonded to the functional groups to form removed material. In some examples, as indicated at 708, regenerating the pad includes reacting the substrate material bonded to the functional groups with a stripping agent configured to break the bonds between the functional groups and the substrate material bonded to the functional groups. For example, the functionalized chemical planarization pad 304 is regenerated by applying stripping agent HX to separate the substrate material (M) from the functional groups (R) and form removed material MX.

As indicated at 710, in some examples, reacting the substrate material bonded to the functional groups with the stripping agent includes reacting the substrate material with the dissolved complexing agent. In some examples, at 712, the substrate material includes a metal, and applying the regeneration solution to break the bonds between the functional groups and the substrate material includes forming a metal oxide from the metal.

At 714, the method 700 includes complexing the removed material in a dissolved complexing agent to form dissolved material in an effluent phase. In some examples, at 716, complexing the removed material in the dissolved complexing agent includes complexing the removed material with one or more of a hydroxide, an alcohol, an acid, an amine, an azole, a macrocyclic compound, a sulfonate, a sulfite ester, poly-diallyldimethylammonium chloride (DADMAC), mono-DADMAC, a persulfate, ammonia, ethylenediaminetetraacetic acid (EDTA), diethylenetriaminepentaacetic acid (DTPA), nitrilotriacetic acid (NTA), ethylene diamine, an amino acid, iminodisuccinic acid (IDS), ethylenediaminedisuccinic acid (EDDS), glutamic acid diacetate (GLDA), or methylglycinediacetic acid (MGDA).

Referring now to step 718 of FIG. 7B, in some examples, the method 700 includes recovering the dissolved material from the effluent phase. In some examples, as indicated at 720, recovering the dissolved material includes extracting the dissolved material via one or more of liquid-liquid extraction, solvent extraction, or membrane separation. As indicated at 722, in some examples, an active solvent component of the solvent extraction includes one or more of an amine, an alkyl phosphoric acid, or a sulfonate. In some examples, at 724, the method 700 includes performing the solvent extraction with a solution that includes a modifier. At 726, in some examples, the modifier includes one or more of di-butyl-butyl phosphonate, phosphine oxide, tributyl phosphate, or isopropyl alcohol. In some examples, at 728, extracting the dissolved material via the solvent extraction includes extracting the dissolved material via an ion pair extraction. At 730, extracting the dissolved material via the membrane separation includes extracting the dissolved material via a liquid membrane system or a surfactant liquid membrane system. In some examples, at 732, the method 700 further comprises recovering a metal species in a single step using the surfactant liquid membrane system; or recovering the metal species in a two-step process comprising, extracting the metal species from the effluent into an organic solution via the liquid membrane system, and stripping the metal species from the organic solution into an aqueous phase.

In some examples, at 734, the effluent includes at least a first metal species and a second metal species. The method 700 further comprises extracting the first metal species in a first extraction stage. The second metal species remains in the effluent following the first extraction stage. The method 700 further includes extracting the second metal species in a second extraction stage.

Another aspect provides a method for using a functionalized chemical planarization pad in planarization processes, the method comprising: planarizing a substrate material with the functionalized chemical planarization pad, the functionalized chemical planarization pad including a plurality of functional groups bonded to a material of the pad, the functional groups being configured to chemically react with the substrate material such that a portion of substrate material bonds to the functional groups; regenerating the pad by applying a regeneration solution configured to break bonds between the functional groups and substrate material bonded to the functional groups to form removed material; and complexing the removed material in a dissolved complexing agent to form dissolved material in an effluent phase. In some examples, the substrate material additionally or alternatively includes one or more of copper, cobalt, gold, hafnium, zirconium, rhenium, niobium, molybdenum, ruthenium, tantalum, vanadium, tungsten, TaN, TiN, polysilicon, or silicon. In some examples, regenerating the pad additionally or alternatively includes reacting the substrate material bonded to the functional groups with a stripping agent configured to break the bonds between the functional groups and the substrate material bonded to the functional groups. In some examples, reacting the substrate material bonded to the functional groups with the stripping agent additionally or alternatively includes reacting the substrate material with the dissolved complexing agent. In some examples, complexing the removed material in the dissolved complexing agent additionally or alternatively includes complexing the removed material with one or more of a hydroxide, an alcohol, an acid, an amine, an azole, a macrocyclic compound, a sulfonate, a sulfite ester, poly-DADMAC, mono-DADMAC, a persulfate, ammonia, EDTA, DTPA, NTA, ethylene diamine, an amino acid, IDS, EDDS, GLDA, or MGDA. In some examples, the substrate material additionally or alternatively includes a metal, and applying the regeneration solution to break the bonds between the functional groups and the substrate material additionally or alternatively includes forming a metal oxide from the metal. In some examples, the method additionally or alternatively includes recovering the dissolved material from the effluent phase. In some examples, recovering the dissolved material additionally or alternatively includes extracting the dissolved material via one or more of liquid-liquid extraction, solvent extraction, or membrane separation. In some examples, an active solvent component of the solvent extraction additionally or alternatively includes one or more of an amine, an alkyl phosphoric acid, or a sulfonate. In some examples, the method additionally or alternatively includes performing the solvent extraction with a solution that includes a modifier. In some examples, the modifier additionally or alternatively includes one or more of di-butyl-butyl phosphonate, phosphine oxide, tributyl phosphate, or isopropyl alcohol. In some examples, extracting the dissolved material via the solvent extraction additionally or alternatively includes extracting the dissolved material via an ion pair extraction. In some examples, extracting the dissolved material via the membrane separation additionally or alternatively includes extracting the dissolved material via a liquid membrane system or a surfactant liquid membrane system. In some examples, the method additionally or alternatively includes recovering a metal species in a single step using the surfactant liquid membrane system; or recovering the metal species in a two-step process comprising, extracting the metal species from the effluent into an organic solution via the liquid membrane system, and stripping the metal species from the organic solution into an aqueous phase. In some examples, the effluent additionally or alternatively includes at least a first metal species and a second metal species, and the method additionally or alternatively includes extracting the first metal species in a first extraction stage, wherein the second metal species remains in the effluent following the first extraction stage; and extracting the second metal species in a second extraction stage.

Another aspect provides a method for recovering metal species in a planarization process, the method comprising: receiving, from the planarization process, a liquid effluent phase comprising a removed metal substrate material complexed to a complexing agent; extracting the dissolved material into a liquid extraction phase; and recovering the removed metal substrate material from the liquid extraction phase. In some examples, the removed metal substrate material additionally or alternatively includes one or more of copper, cobalt, gold, hafnium, zirconium, rhenium, niobium, molybdenum, ruthenium, tantalum, vanadium, tungsten, TaN, TiN, polysilicon, or silicon. In some examples, receiving the dissolved material additionally or alternatively includes receiving the removed metal substrate material complexed with one or more of a hydroxide, an alcohol, an acid, an amine, an azole, a macrocyclic compound, a sulfonate, a sulfite ester, poly-DADMAC, mono-DADMAC, a persulfate, ammonia, EDTA, DTPA, NTA, ethylene diamine, an amino acid, IDS, EDDS, GLDA, or MGDA. In some examples, extracting the dissolved material additionally or alternatively includes extracting the dissolved material via one or more of liquid-liquid extraction, solvent extraction, or membrane separation.

Another aspect provides a method for using a functionalized chemical planarization pad and recovery of metal species in planarization processes, the method comprising: planarizing a substrate material with the functionalized chemical planarization pad including a plurality of functional groups bonded to a material of the pad, the functional groups being configured to chemically react with the substrate material such that a portion of substrate material bonds to the functional groups; regenerating the pad by applying a regeneration solution configured to break bonds between the functional groups and substrate material bonded to the functional groups to form removed material; complexing the removed material in a dissolved complexing agent to form dissolved material in an effluent phase; and recovering the dissolved material from the effluent phase.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

Further, it will be appreciated that the terms "includes," "including," "has," "contains," variants thereof, and other similar words used in either the detailed description or the claims are intended to be inclusive in a manner similar to the term "comprising" as an open transition word without precluding any additional or other elements.

The invention claimed is:

1. A method for using a functionalized chemical planarization pad in planarization processes, the method comprising:
   planarizing a substrate material with the functionalized chemical planarization pad and an abrasive-free planarization solution, the functionalized chemical planarization pad including a plurality of functional groups covalently bonded to a polyurethane material of the pad, the functional groups being configured to chemically react with the substrate material such that a portion of substrate material bonds to the functional groups;
   regenerating the pad by applying a regeneration solution configured to break bonds between the functional groups and substrate material bonded to the functional groups to form removed material, wherein regenerating the pad includes reacting the substrate material bonded to the functional groups with a stripping agent configured to break the bonds between the functional groups and the substrate material bonded to the functional groups; and
   complexing the removed material in a dissolved complexing agent to form dissolved material in an effluent phase,
   wherein the stripping agent and the dissolved complexing agent are different materials, and wherein the dissolved complexing agent is provided in the regeneration solution contemporaneously with the stripping agent.

2. The method of claim 1, wherein the substrate material includes one or more of copper, cobalt, gold, hafnium, zirconium, rhenium, niobium, molybdenum, ruthenium, tantalum, vanadium, tungsten, TaN, TiN, polysilicon, or silicon.

3. The method of claim 1, wherein reacting the substrate material bonded to the functional groups with the stripping agent includes reacting the substrate material with the dissolved complexing agent.

4. The method of claim 1, wherein complexing the removed material in the dissolved complexing agent includes complexing the removed material with one or more of a hydroxide, an alcohol, an acid, an amine, an azole, a macrocyclic compound, a sulfonate, a sulfite ester, polydiallyldimethylammonium chloride (DADMAC), mono-DADMAC, a persulfate, ammonia, ethylenediaminetetraacetic acid (EDTA), diethylenetriaminepentaacetic acid (DTPA), nitrilotriacetic acid (NTA), ethylene diamine, an amino acid, iminodisuccinic acid (IDS), ethylenediaminedisuccinic acid (EDDS), glutamic acid diacetate (GLDA), or methylglycinediacetic acid (MGDA).

5. The method of claim 1, wherein the substrate material includes a metal, and wherein applying the regeneration solution to break the bonds between the functional groups and the substrate material includes forming a metal oxide from the metal.

6. The method of claim 1, further comprising recovering the dissolved material from the effluent phase.

7. The method of claim 6, wherein recovering the dissolved material includes extracting the dissolved material via one or more of liquid-liquid extraction, solvent extraction, or membrane separation.

8. The method of claim 7, wherein an active solvent component of the solvent extraction includes one or more of an amine, an alkyl phosphoric acid, or a sulfonate.

9. The method of claim 7, further comprising performing the solvent extraction with a solution that includes a modifier.

10. The method of claim 9, wherein the modifier includes one or more of di-butyl-butyl phosphonate, phosphine oxide, tributyl phosphate, or isopropyl alcohol.

11. The method of claim 7, wherein extracting the dissolved material via the solvent extraction includes extracting the dissolved material via an ion pair extraction.

12. The method of claim 7, wherein extracting the dissolved material via the membrane separation includes extracting the dissolved material via a liquid membrane system or a surfactant liquid membrane system.

13. The method of claim 12, further comprising:
   recovering a metal species in a single step using the surfactant liquid membrane system; or
   recovering the metal species in a two-step process comprising, extracting the metal species from the effluent into an organic solution via the liquid membrane system, and stripping the metal species from the organic solution into an aqueous phase.

14. The method of claim 6, wherein the effluent includes at least a first metal species and a second metal species, the method further comprising:
- extracting the first metal species in a first extraction stage, wherein the second metal species remains in the effluent following the first extraction stage; and
- extracting the second metal species in a second extraction stage.

15. A method for using a functionalized chemical planarization pad and recovery of metal species in planarization processes, the method comprising:
- planarizing a substrate material with an abrasive-free planarization solution and the functionalized chemical planarization pad including a plurality of functional groups covalently bonded to a polyurethane material of the pad, the functional groups being configured to chemically react with the substrate material such that a portion of substrate material bonds to the functional groups;
- regenerating the pad by applying a regeneration solution configured to break bonds between the functional groups and substrate material bonded to the functional groups to form removed material, wherein the regeneration solution comprises a dissolved complexing agent, and wherein the dissolved complexing agent comprises at least a chelating agent;
- complexing the removed material in the dissolved complexing agent to form dissolved material in an effluent phase; and
- recovering the dissolved material from the effluent phase.

16. The method of claim 15, wherein complexing the removed material in the dissolved complexing agent includes complexing the removed material with one or more of a hydroxide, an alcohol, an acid, an amine, an azole, a macrocyclic compound, a sulfonate, a sulfite ester, polydiallyldimethylammonium chloride (DADMAC), mono-DADMAC, a persulfate, ammonia, ethylenediaminetetraacetic acid (EDTA), diethylenetriaminepentaacetic acid (DTPA), nitrilotriacetic acid (NTA), ethylene diamine, an amino acid, iminodisuccinic acid (IDS), ethylenediaminedisuccinic acid (EDDS), glutamic acid diacetate (GLDA), or methylglycinediacetic acid (MGDA).

* * * * *